(No Model.)
H. HORTOP.
ROAD CART.
No. 291,733. Patented Jan. 8, 1884.
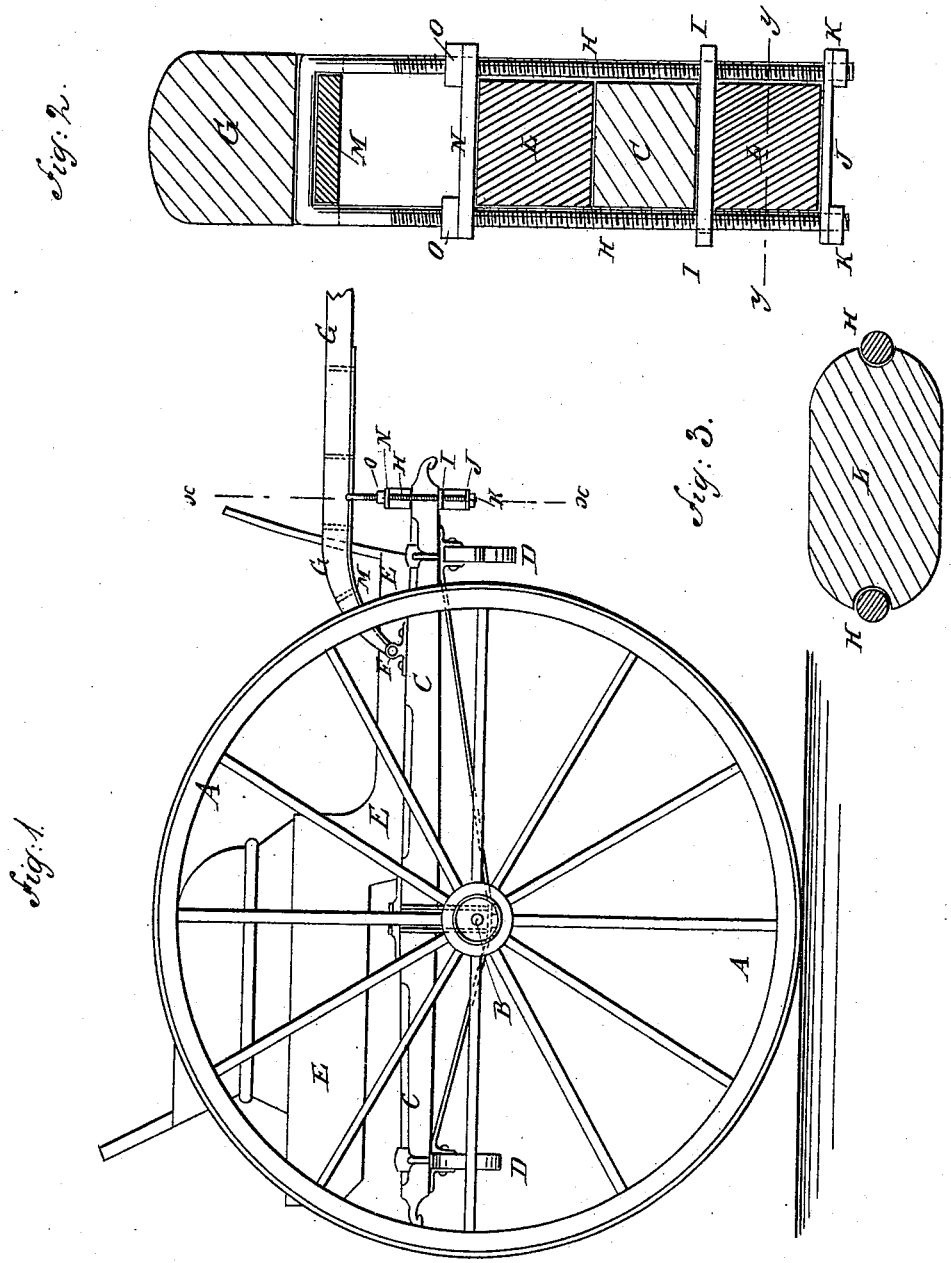
WITNESSES:
INVENTOR:
BY
ATTORNEYS.

United States Patent Office.

HENRY HORTOP, OF RUTHERFORD, CALIFORNIA.

ROAD-CART.

SPECIFICATION forming part of Letters Patent No. 291,733, dated January 8, 1884.

Application filed September 25, 1883. (No model.)

*To all whom it may concern:*

Be it known that I, HENRY HORTOP, of Rutherford, in the county of Napa and State of California, have invented a new and useful Improvement in Road-Carts, of which the following is a full, clear, and exact description.

Reference is to be had to the accompanying drawings, forming a part of this specification, in which similar letters of reference indicate corresponding parts in all the figures.

Figure 1 is a side elevation of a road-cart to which my improvement has been applied. Fig. 2 is a sectional elevation of a part of the same, enlarged, taken through the line $xx$, Fig. 1. Fig. 3 is a plan view of a part of the same, taken through the line $yy$, Fig. 2.

The object of this invention is to promote the comfort of those riding in road-carts, and also to facilitate the adjustment of such carts to large and small horses.

The invention consists in a road-cart constructed with springs above and below the forward ends of the side bars, and kept in place by staples attached to the thills, guide-eyes attached to the side bars, and yokes, whereby the unpleasant motion of the cart-body will be prevented, and the cart can be readily adjusted for a large or a small horse, as will be hereinafter fully described.

A represents a wheel, and B the axle, of a road-cart.

C are the side bars, which are clipped to the axle B, and to the end parts of which are attached springs D.

To the springs D is attached the cart-body E.

To the upper sides of the side bars, C, are connected, by ordinary thill-couplings, F, the ends of the thills G.

To the thills G, over the forward ends of the side bars, C, and between the said thills and the thill-irons M, are secured the bends of long U-bolts or staples H, the arms of which pass down through the eyes I of eyebolts or yokes attached to the lower sides of the side bars, C, or of screws or other guides attached to the sides of the said side bars, through yokes J, placed a little below the said side bars, C, and have nuts K screwed upon their ends.

Within the staples H, above and below the side bars, C, are placed rubber blocks L or other suitable springs, the lower one of which rests upon the yoke J. The upper block, L, is kept in place by a cross-bar or yoke, N, which is held down upon the said upper block, L, by nuts O, screwed upon the arms of the staple H, the said arms being provided with screw-threads for their whole length, or nearly their whole length. With this construction, by turning the nuts K O up the distance between the forward ends of the side bars, C, the thills G will be lessened, lowering the forward ends of the said thills, and adapting the cart to be used with a small horse. The cart is adjusted for use with a large horse by turning the nuts K O down. By this construction a certain amount of play will be given to the thills, by which the body of the cart will be relieved from the unpleasant motion caused by the movements of the horse.

Having thus described my invention, I claim as new and desire to secure by Letters Patent—

1. A road-cart constructed with springs above and below the forward ends of the side bars, and kept in place by staples attached to the thills, as set forth.

2. In a road-cart, the combination, with the side bars, C, and the thills G, of the staples H, the yokes J M, the nuts K O, the guide-eyes I, and the springs L, substantially as herein shown and described, whereby a certain amount of play will be given to the thills, to prevent the unpleasant motion of the cart-body, and the cart can be readily adjusted for large and small horses, as set forth.

HENRY HORTOP.

Witnesses:
CHAS. O. DAGER,
WM. H. COBBLEDICK.